US012650165B2

(12) United States Patent　　　　　(10) Patent No.:　US 12,650,165 B2
Murakami　　　　　　　　　　　　　(45) Date of Patent:　　Jun. 9, 2026

(54) CENTERING MECHANISM, MACHINE, AND ROBOT

(71) Applicant: Fanuc Corporation, Yamanashi (JP)

(72) Inventor: Wataru Murakami, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 6 days.

(21) Appl. No.: 18/693,213

(22) PCT Filed: Sep. 29, 2021

(86) PCT No.: PCT/JP2021/035960

§ 371 (c)(1),
(2) Date: Mar. 19, 2024

(87) PCT Pub. No.: WO2023/053292

PCT Pub. Date: Apr. 6, 2023

(65) Prior Publication Data

US 2025/0122930 A1　　　Apr. 17, 2025

(51) Int. Cl.
*F16H 57/021*　　　(2012.01)
*F16H 57/00*　　　(2012.01)
*F16H 57/02*　　　(2012.01)

(52) U.S. Cl.
CPC ... *F16H 57/021* (2013.01); *F16H 2057/0056* (2013.01); *F16H 2057/02034* (2013.01)

(58) Field of Classification Search
CPC ........... F16H 57/021; F16H 2057/0056; F16H 2057/02034; F16H 49/001
See application file for complete search history.

(56) References Cited

U.S. PATENT DOCUMENTS

| | | | | |
|---|---|---|---|---|
| 4,339,984 | A * | 7/1982 | Huhne | ................. G05B 19/231 |
| | | | | 901/22 |
| 4,589,816 | A | 5/1986 | Eberle et al. | |
| 4,951,518 | A | 8/1990 | Hendershot | |
| 5,155,423 | A * | 10/1992 | Karlen | .................... B25J 9/046 |
| | | | | 318/568.1 |
| 5,823,061 | A * | 10/1998 | Tomiyasu | ................ B25J 9/047 |
| | | | | 901/23 |
| 10,632,628 | B2 * | 4/2020 | Hasuo | .................. B25J 19/0066 |
| 11,992,938 | B2 * | 5/2024 | Mori | ..................... B25J 15/0408 |
| 2014/0157925 | A1 | 6/2014 | Yajima et al. | |

(Continued)

FOREIGN PATENT DOCUMENTS

| | | |
|---|---|---|
| DE | 10 2013 002 189 A1 | 8/2013 |
| DE | 11 2012 000 394 T5 | 8/2014 |

(Continued)

OTHER PUBLICATIONS

International Search Report (PCT/ISA/210) with translation and Written Opinion (PCT/ISA/237) mailed on Nov. 9, 2021, by the Japanese Patent Office as the International Searching Authority for International Application No. PCT/JP2021/035960. (8 pages).

*Primary Examiner* — Jake Cook

(74) *Attorney, Agent, or Firm* — BUCHANAN INGERSOLL & ROONEY PC

(57)　　　　　ABSTRACT

A centering mechanism is provided with a speed reducer, a bearing that is disposed radially outward from the center line of the speed reducer, and an adapter that is fixed to the speed reducer and maintains the speed reducer and the bearing to be coaxial.

6 Claims, 9 Drawing Sheets

(56) References Cited

U.S. PATENT DOCUMENTS

| 2014/0196554 | A1 | 7/2014 | Kato et al. |
| 2015/0285356 | A1 | 10/2015 | Kurogi et al. |

FOREIGN PATENT DOCUMENTS

| DE | 11 2013 004 707 | T5 | 6/2015 |
| JP | S5450758 | A | 4/1979 |
| JP | S5973299 | A | 4/1984 |
| JP | H07108485 | A | 4/1995 |
| JP | 2002295605 | A | 10/2002 |

* cited by examiner

CENTERING MECHANISM, MACHINE, AND ROBOT

CROSS REFERENCE TO RELATED APPLICATIONS

This is the U.S. National Phase application of PCT/JP2021/035960, filed Sep. 29, 2021, the disclosures of this application being incorporated herein by reference in their entireties for all purposes.

FIELD OF THE INVENTION

The present invention relates to a machine centering technology, and in particular, to a centering structure, a machine, and a robot.

BACKGROUND OF THE INVENTION

In large robots for transporting heavy objects, since large loads are exerted on the joints of the robot, a structure in which the bearings which support the load are arranged separately instead of being built into the decelerator is known. In such a structure, since there are no bearings inside the decelerator, it is necessary to ensure concentricity between the decelerator and the bearings (also referred to as centering, center alignment, axis alignment, alignment, etc.). If the axes of the decelerator and bearing are misaligned when assembled, vibration will occur, resulting in premature machine damage and deterioration of machine positioning accuracy. As background technology related to the present application, the literature described below is publicly known.

Patent Literature 1 (Japanese Unexamined Patent Publication (Kokai) No. 7-108485) describes a rotary joint of a robot, wherein a cross-roller bearing is arranged on a fixed base to rotatably support a decelerator case on an inner race of the bearing, and the decelerator case is affixed to a rotating body.

Patent Literature 2 (Japanese Unexamined Patent Publication (Kokai) No. 2002-295605) describes a structure for restricting movement in the axial direction of a planetary member of a speed reduction device, wherein internal gears (case) of the decelerator contact only a portion of the inner race of the bearing in the axial direction, a retention ring is fitted into the inner race of the bearing where the internal gears are not present, and the retention ring restricts movement of a planetary gear in the axial direction.

PATENT LITERATURE

PTL 1: Japanese Unexamined Patent Publication (Kokai) No. 7-108485
PTL 2: Japanese Unexamined Patent Publication (Kokai) No. 2002-295605

SUMMARY OF THE INVENTION

In light of the problems of the prior art, the present invention aims to provide a technology for achieving concentricity between a decelerator and a bearing.

An aspect of the present disclosure provides a centering structure, comprising a decelerator, a bearing which is arranged radially outward from a center line of the decelerator, and an adapter which is affixed to the decelerator to maintain concentricity between the decelerator and the bearing.

Another aspect of the present disclosure provides a centering structure, comprising a decelerator, a bearing which is arranged radially outward from a center line of the decelerator, and a link which is affixed to the decelerator and the bearing to maintain concentricity between the decelerator and the bearing.

Yet another aspect of the present disclosure provides a machine or robot comprising such centering structure.

According to an aspect of the present disclosure, the axial centers of the decelerator and the bearing can be aligned by the adapter, which maintains concentricity between the decelerator and the bearing. As a result, vibration of the decelerator is reduced, whereby damage to the decelerator can be suppressed.

According to another aspect of the present disclosure, the axial centers of the decelerator and the bearing can be aligned by the link, which maintains concentricity between the decelerator and the bearing. As a result, vibration of the decelerator is reduced, whereby damage to the decelerator can be suppressed.

According to yet another aspect of the present disclosure, by providing a machine or robot with such a centering structure, vibration of the machine or robot is reduced, whereby damage to the machine or robot can be suppressed and the positioning accuracy of the machine or robot can be improved.

DETAILED DESCRIPTION OF EMBODIMENTS OF THE INVENTION

Figure 1:
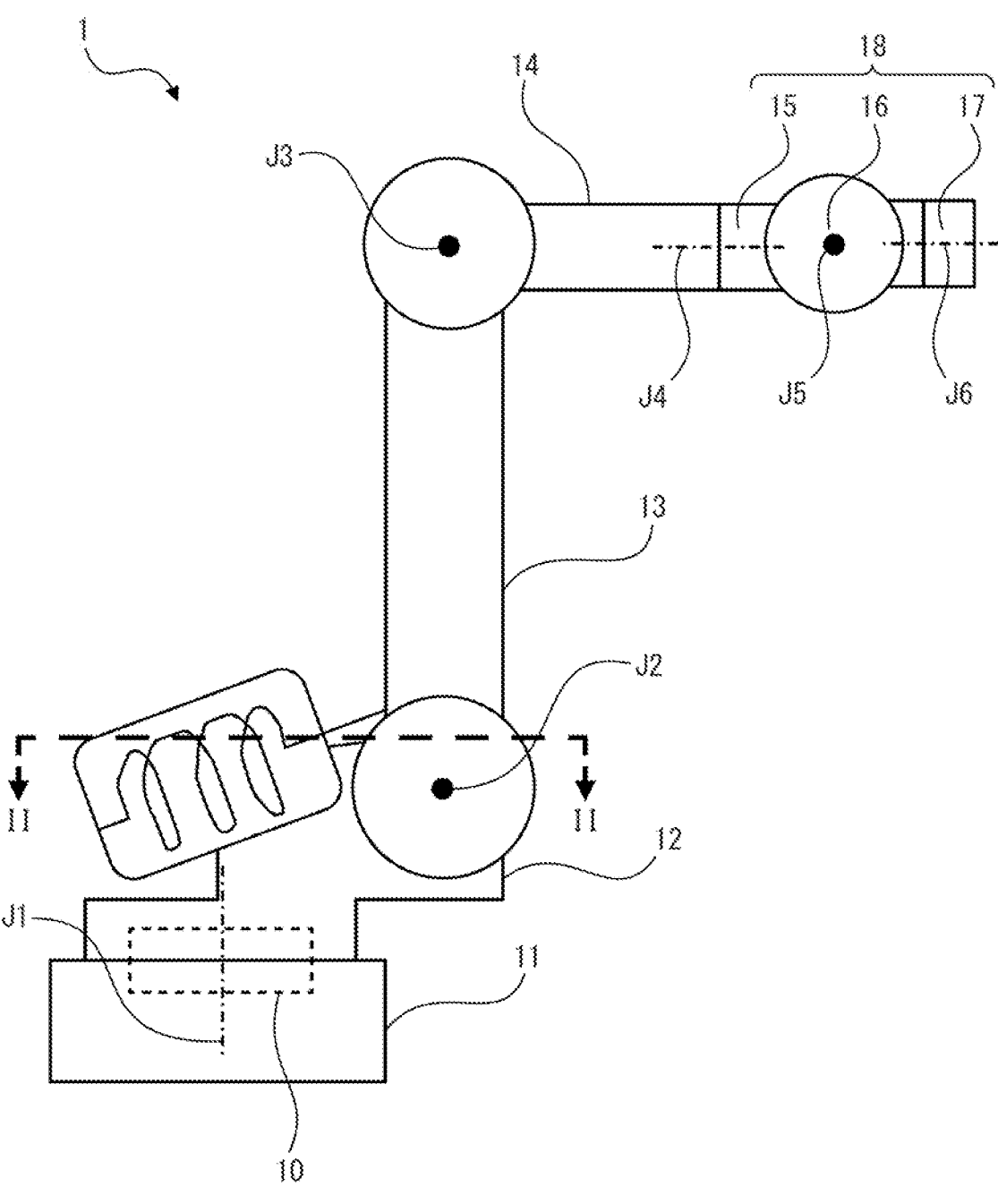
FIG. 1 is an overall view of a machine comprising a centering structure according to a first embodiment.

The embodiments of the present disclosure will be described in detail below with reference to the attached drawings. In the drawings, identical or corresponding constituent elements have been assigned the same or corresponding reference signs. Furthermore, the embodiments described below do not limit the technical scope of the invention or the meaning of terms described in the claims.

A machine comprising the centering structure according to a first embodiment will be described in detail. FIG. 1 is an overall view of a machine 1 comprising a centering structure of the first embodiment. The machine 1 of the present embodiment is an industrial robot, and in particular, an articulated robot, but other embodiments may include other types of robots, such as single-joint robots, parallel link robots, humanoids, etc. In another embodiment, the machine 1 may be an industrial machine such as a machine tool, a construction machine, or an agricultural machine, or another machine such as a vehicle or an aircraft.

The machine 1 includes a plurality of links 11 to 17 which are rotatably coupled, but in other embodiments the machine 1 may include a plurality of links that are coupled so as to be linearly movable. The machine 1 also includes a rotational joint between the plurality of links 11 to 17, but in other embodiments, the machine 1 may include a prismatic joint between the plurality of links 11 to 17.

The first link 11 is a fixed base which is affixed at a predetermined position, and the second link 12 is a rotating body which is supported so as to be rotatable relative to the first link 11 about a first axis line J1. The third link 13 is an upper arm which is supported so as to be rotatable relative to the second link 12 about a second axis line J2 perpendicular to the first axis line J1, and the fourth link 14 is a forearm which is supported so as to be rotatable relative to the third link 13 about a third axis line J3 parallel to the second axis line J2. The fifth link 15, the sixth link 16, and the seventh link 17 are a triaxial wrist unit 18 attached to the fourth link.

The fifth link 15 is a first wrist element which is supported so as to be rotatable relative to the fourth link 14 about a fourth axis line J4 perpendicular to the third axis line J3, the sixth link 16 is a second wrist element which is supported so as to be rotatable relative to the fifth link 15 about a fifth axis line J5 perpendicular to the fourth axis line J4, and the seventh link 17 is a third wrist element which is supported so as to be rotatable relative to the sixth link 16 about a sixth axis line J6 perpendicular to the fifth axis line J5.

The machine 1 comprises an actuator 10 including various machine elements such as an electric motor, a decelerator, and a bearing at the joints between the plurality of links 11 to 17. In order to support a relatively large load, the actuator 10 has a structure in which the bearing is not incorporated into the decelerator but is arranged separately. In such a structure, since the bearing is not inside the decelerator, it is necessary to ensure concentricity between the decelerator and the bearing (also referred to as centering, center alignment, axis alignment, alignment, etc.). If the axes of the decelerator and bearing are misaligned when assembled, vibration will occur, leading to premature failure of the decelerator. This in turn leads to early damage to the machine and deterioration of the positioning accuracy of the machine. Thus, the machine 1 or the actuator 10 comprises a centering structure with which the axes of the decelerator and the bearing can be aligned.

Figure 2:
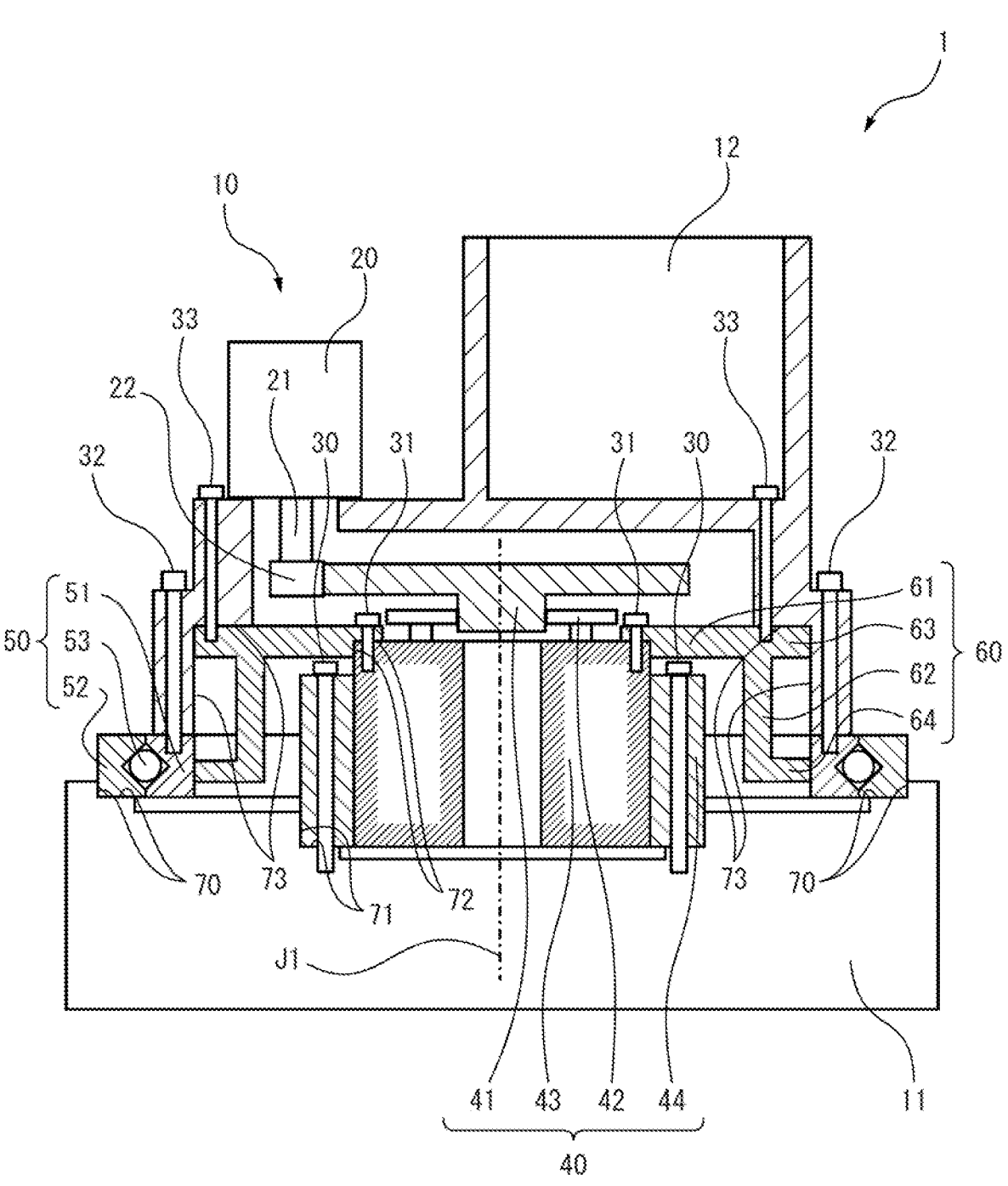
FIG. 2 is a cross-sectional view of the centering structure of the first embodiment taken along II-II.

FIG. 2 is a cross-sectional view taken along line II-II of the centering structure of the first embodiment. The centering structure of the present embodiment is a joint structure between the first link 11 and the second link 12 (joint structure of first axis line J1), but in other embodiments, the centering structure can also be applied to the joint structures between the other links 12 to 17 (joint structures of the other axis lines J2 to J6). The actuator 10 includes an electric motor 20, a decelerator 40, a bearing 50, and an adapter 60, and the centering structure of the present embodiment includes the decelerator 40, the bearing 50, the adapter 60, the first link 11, and the second link 12.

The electric motor 20 includes a rotating axis 21 and a motor side gear 22 connected to the rotating shaft 21. The decelerator 40 includes a central gear 41 that meshes with the motor side gear 22, a plurality of orbiting gears 42 that mesh with the central gear 41, a shaft 43 that rotatably supports the plurality of orbiting gears 42, and a case 44 that meshes with the shaft 43. The decelerator 40 of the present embodiment is composed of a planetary gear decelerator, in which the central gear 41 corresponds to a sun gear, the orbiting gears 42 correspond to planetary gears, the shaft 43 corresponds to a planetary carrier, and the case 44 corresponds to an internal gear. In other embodiments, the decelerator 40 may be another type of decelerator, such as a wave gear decelerator.

The bearing 50 includes an inner race 51, an outer race 52, and a rolling body 53 that rolls between the inner race 51 and the outer race 52. The bearing 50 is arranged radially outward from the center line of the decelerator 40. The bearing 50 is arranged radially outward from the outermost diameter of the decelerator 40, but in other embodiments, the inner race 51 of the bearing 50 may be arranged radially inward from the outermost diameter of the decelerator 40, and the outer race 52 of the bearing 50 may be arranged radially outward from the outermost diameter of the decelerator 40. Furthermore, since the bearing 50 is arranged between the top surface and the bottom surface of the decelerator 40, the size of the centering structure (i.e., the joint structure) can be reduced. The bearing 50 of the present embodiment is a cross roller bearing which can support loads in various directions such as axial loads, radial loads, and moment loads. In other embodiments, other types of bearings such as angular ball bearing, tapered roller bearing, etc., may be used as the bearing 50. The adapter 60 is a flanged cylindrical body, and includes a cylindrical part 62, an inner flange 61 extending inward from the cylindrical part 62, a first outer flange 63 extending outward from the cylindrical part 62, and a second outer flange 64 extending outward from the cylindrical part 62.

The electric motor 20 is affixed to the second link 12, the decelerator 40 is affixed to the first link 11 and the adapter 60, the bearing 50 is affixed to the first link 11 and the second link 12, and the adapter 60 is affixed to the decelerator 40 and the second link 12. Specifically, the case 44 of the decelerator 40 is affixed to the first link 11 with screws 30, and the shaft 43 of the decelerator 40 is affixed to the inner flange 61 of the adapter 60 with screws 31. The outer race 52 of the bearing 50 is affixed to the first link 11 with screws (not illustrated) or the like, and the inner race 51 of the bearing 50 is affixed to the second link 12 with screws 32. The first outer flange 63 of the adapter 60 is affixed to the second link 12 with screws 33.

The electric motor 20 rotates the rotating shaft 21 and the motor side gear 22, and transmits torque from the motor side gear 22 to the central gear 41 of the decelerator 40. The decelerator 40 decelerates and rotates the central gear 41, the orbiting gears 42, and the shaft 43 in this order, and transmits a larger torque from the shaft 43 to the adapter 60. The adapter 60 rotates to transmit torque to the second link 12, and the bearing 50 rotatably supports the second link 12. The bearing 50 supports the links 12 to 17 of the machine 1 and the load exerted on the tip of the machine 1.

Since the outer diameter of the case 44 of the decelerator 40 is smaller than the inner diameter of the bearing 50, it is necessary to establish concentricity between the case 44 of the decelerator 40 and the bearing 50. The first link 11 includes a mating part 70 that mates with the outer race 52 of the bearing 50, and a mating part 71 that mates with the case 44 of the decelerator 40, whereby concentricity between the case 44 of the decelerator 40 and the bearing 50 can be achieved. The mating parts 70, 71 are, for example, stepped holes. Due to the first link 11, which maintains concentricity between the case 44 of the decelerator 40 and the bearing 50, the respective axis centers of the case 44 of the decelerator 40 and the bearing 50 are aligned with the first axis line J1.

Further, since the outer diameter of the shaft 43 of the decelerator 40 is smaller than the inner diameter of the bearing 50 and the inner diameter of the second link 12, the adapter 60 compensates for the size difference between the shaft 43 of the decelerator 40, the bearing 50, and the second link 12, and maintains concentricity between the shaft 43 of the decelerator 40, the bearing 50, and the second link 12. The inner flange 61 of the adapter 60 comprises a mating part 72 that mates with the shaft 43 of the decelerator 40, the outer peripheral surface of the second outer flange 64 of the adapter 60 is inscribed in the inner race 51 of the bearing 50 (in contact with the inner peripheral surface thereof), and the second link 12 comprises a mating part 73 that mates with the first outer flange 63 of the adapter 60, whereby concentricity between the shaft 43 of the decelerator 40, the bearing 50, and the second link 12 can be achieved. The mating parts 72 and 73 are, for example, stepped holes. The shaft 43 of the decelerator 40, the bearing 50, and the second link 12 are aligned with the first axis line J1 by the adapter 60, which maintains concentricity between the shaft 43 of the decelerator 40, the bearing 50, and the second link 12.

The shaft 43 and case 44 of the decelerator 40 may be assembled with their respective axis centers shifted due to the gap between the shaft 43 and the case 44 (for example, the gap between gears), but since the adapter 60 maintains concentricity between the shaft 43 of the decelerator 40 and the bearing 50, and the first link 11 maintains concentricity between the case 44 of the decelerator 40 and the bearing 50, the respective axis centers of the shaft 43 and case 44 of the decelerator 40 are also aligned with the first axis line J1.

According to the centering structure of the first embodiment described above, the axes of the decelerator 40 and the bearing 50 are aligned by the adapter 60, which maintains concentricity between the decelerator 40 and the bearing 50, whereby vibration of the decelerator 40 is reduced and damage to the decelerator 40 can be suppressed. In particular, the axis centers of the shaft 43 and case 44 of the decelerator 40 are aligned by the adapter 60, which maintains concentricity between the shaft 43 of the decelerator 40 and the bearing 50, and the first link 11, which maintains concentricity between the case 44 of the decelerator 40 and the bearing 50, whereby vibration is reduced when the shaft 43 and case 44 of the decelerator 40 are assembled with their axes misaligned, and damage to the decelerator 40 can be suppressed. Furthermore, since the machine 1 is provided with such a centering structure, vibration of the machine 1 is reduced, whereby damage to the machine 1 can be suppressed and the positioning accuracy of the machine 1 can be improved.

Figure 3:
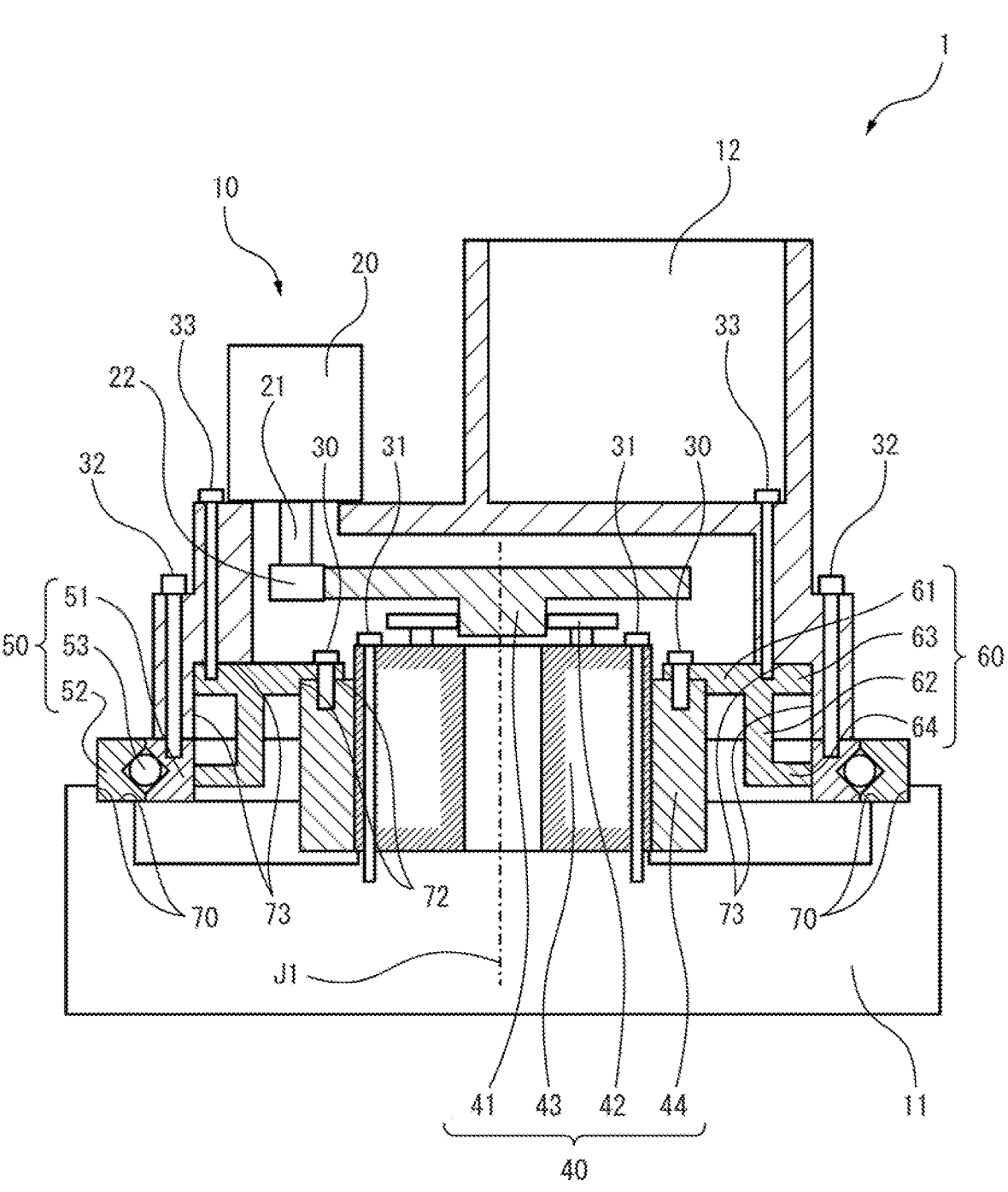
FIG. 3 is a cross-sectional view of the centering structure of a second embodiment taken along line II-II.

The centering structure of a second embodiment will be described below. FIG. 3 is a cross-sectional view of the centering structure of the second embodiment taken along line II-II. The centering structure of the second embodiment differs from the centering structure of the first embodiment in that the shaft 43 of the decelerator 40 is affixed to the first link 11 with the screws 31, and the case 44 of the decelerator 40 is affixed to the inner flange 61 of the adapter 60 with the screws 30.

The electric motor 20 rotates the rotating shaft 21 and the motor side gear 22, and transmits torque from the motor side gear 22 to the central gear 41 of the decelerator 40. The decelerator 40 decelerates and rotates the central gear 41, the orbiting gears 42, and the case 44 in this order, and transmits a larger torque from the case 44 to the adapter 60. The adapter 60 rotates to transmit torque to the second link 12, and the bearing 50 rotatably supports the second link 12. The bearing 50 supports the links 12 to 17 of the machine 1 and the load exerted on the tip of the machine 1.

In the second embodiment, since the case 44 of the decelerator 40 rotates, the first link 11 does not comprise the mating part 71 that mates with the case 44 of the decelerator 40 in the manner of the first embodiment. The first link 11 comprises the mating part 70 that mates with the outer race 52 of the bearing 50, and screw holes for fastening the shaft 43 of the decelerator 40 with the screws 31, whereby concentricity between the shaft 43 of the decelerator 40 and the bearing 50 can be achieved. Specifically, the screw holes of the first link 11 for connecting the shaft 43 of the decelerator 40 are precisely machined for positioning of the shaft 43 of the decelerator 40. Due to the first link 11, which maintains concentricity between the shaft 43 of the decelerator 40 and the bearing 50, the respective axis centers of the shaft 43 of the decelerator 40 and the bearing 50 are aligned with the first axis line J1.

Since the outer diameter of the case 44 of the decelerator 40 is smaller than the inner diameter of the bearing 50 and the inner diameter of the second link 12, the adapter 60 compensates for the size difference between the case 44 of the decelerator 40, the bearing 50, and the second link 12, and maintains concentricity between the case 44 of the decelerator 40, the bearing 50, and the second link 12. The inner flange 61 of the adapter 60 comprises mating part 72 that mates with the case 44 of the decelerator 40, the outer peripheral surface of the second outer flange 64 of the adapter 60 is inscribed in (is in contact with the inner peripheral surface of) the inner race 51 of the bearing 50, and the second link 12 comprises the mating part 73 that mates with the first outer flange 63 of the adapter 60, whereby concentricity between the case 44 of the decelerator 40, the bearing 50, and the second link 12 can be achieved. The adapter 60 maintains concentricity between the case 44 of the decelerator 40, the bearing 50, and the second link 12, whereby the respective axis centers of the case 44 of the decelerator 40, the bearing 50, and the second link 12 are aligned with the first axis line J1.

The shaft 43 and case 44 of the decelerator 40 may be assembled with their respective axis centers shifted due to the gap between the shaft 43 and case 44 (for example, the gap between gears), but since the adapter 60 maintains concentricity between the case 44 of the decelerator 40 and the bearing 50, and the first link 11 maintains concentricity between the shaft 43 of the decelerator 40 and the bearing 50, the respective axis centers of the shaft 43 and case 44 of the decelerator 40 are also aligned with the first axis line J1.

According to the centering structure of the second embodiment described above, the axes of the decelerator 40 and the bearing 50 are aligned by the adapter 60, which maintains concentricity between the decelerator 40 and the bearing 50, whereby vibration of the decelerator 40 is reduced, and damage to the decelerator 40 can be suppressed. In particular, the axis centers of the shaft 43 and case 44 of the decelerator 40 are aligned by the adapter 60, which maintains concentricity between the case 44 of the decelerator 40 and the bearing 50, and the first link 11, which maintains concentricity between the shaft 43 of the decelerator 40 and the bearing 50, whereby vibration is reduced when the shaft 43 and case 44 of the decelerator 40 are assembled with their axes misaligned, and damage to the decelerator 40 can be suppressed. Furthermore, since the machine 1 is provided with such a centering structure, vibration of the machine 1 is reduced, whereby damage to the machine 1 can be suppressed and the positioning accuracy of the machine 1 can be improved.

Figure 4:
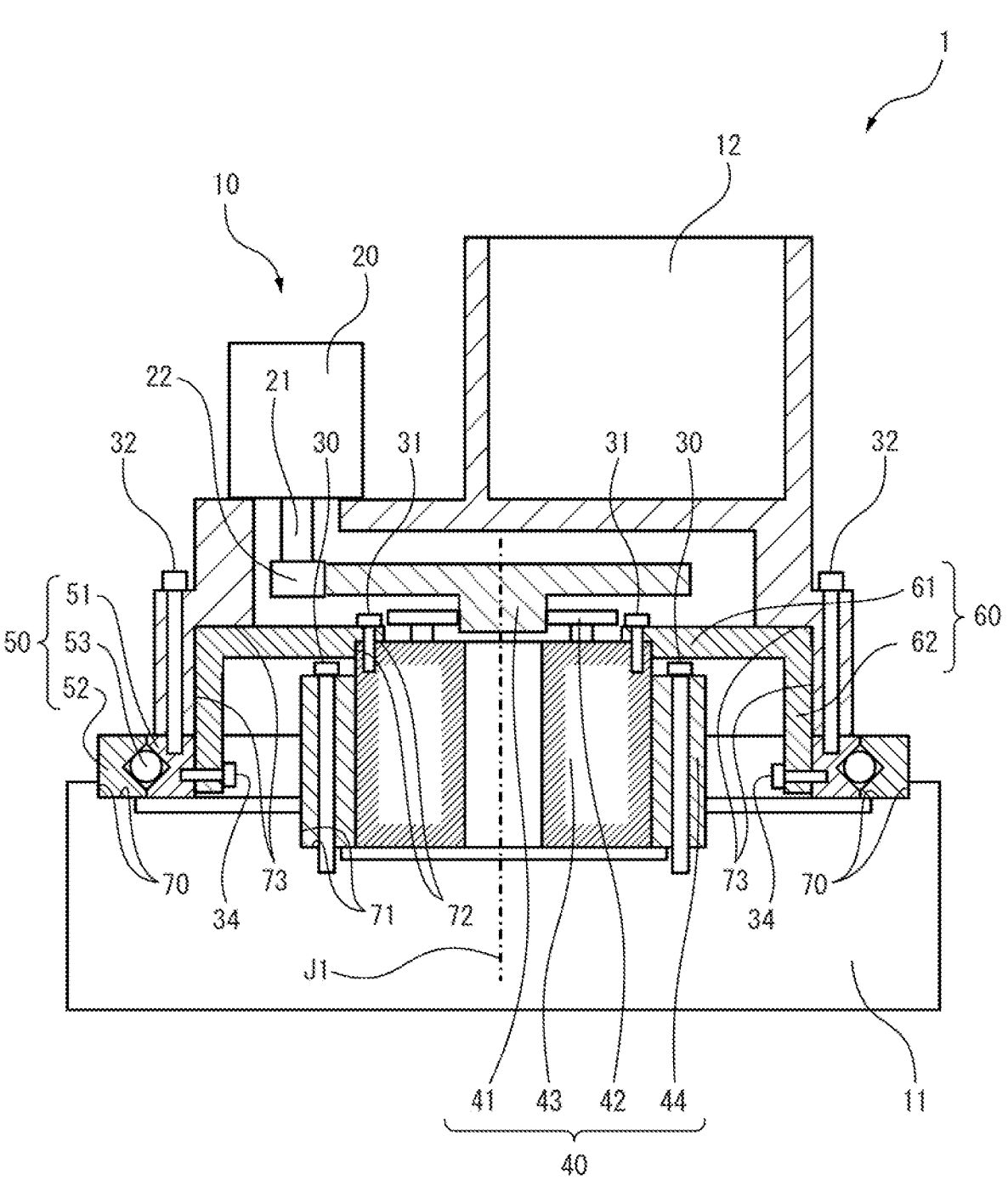
FIG. 4 is a cross-sectional view of the centering structure of a third embodiment taken along line II-II.

The centering structure of a third embodiment will be described below. FIG. 4 is a cross-sectional view of the centering structure of the third embodiment taken along line II-II. The centering structure of the third embodiment differs from the centering structure of the first embodiment in that the adapter 60 is not affixed to the second link 12, but rather to the bearing 50. Specifically, the cylindrical part 62 of the adapter 60 is affixed to the inner peripheral surface of the inner race 51 of the bearing 50 with the screws 34. The adapter 60 also differs from the centering structure of the first embodiment in that it does not comprise the first outer flange 63 and the second outer flange 64, but comprises only the inner flange 61 and the cylindrical part 62. Specifically, the adapter 60 has a simpler shape.

The electric motor 20 rotates the rotating shaft 21 and the motor side gear 22, and transmits torque from the motor side gear 22 to the central gear 41 of the decelerator 40. The decelerator 40 decelerates and rotates the central gear 41, the orbiting gears 42, and the shaft 43 in this order, and transmits a larger torque from the shaft 43 to the adapter 60. The adapter 60 rotates to transmit torque to the inner race 51 of the bearing 50, and the inner race 51 of the bearing 50 rotates to transmit torque to the second link 12. The bearing 50 supports the links 12 to 17 of the machine 1 and the load exerted on the tip of the machine 1.

Since the outer diameter of the case 44 of the decelerator 40 is smaller than the inner diameter of the bearing 50, it is necessary to establish concentricity between the case 44 of the decelerator 40 and the bearing 50. The first link 11 comprises the mating part 70 that mates with the outer race 52 of the bearing 50 and the mating part 71 that mates with the case 44 of the decelerator 40 to establish concentricity between the case 44 of the decelerator 40 and the bearing 50. Due to the first link 11, which maintains concentricity between the case 44 of the decelerator 40 and the bearing 50, the respective axis centers of the case 44 of the decelerator 40 and the bearing 50 are aligned with the first axis line J1.

Since the outer diameter of the shaft 43 of the decelerator 40 is smaller than the inner diameter of the bearing 50 and the inner diameter of the second link 12, the adapter 60 compensates for the size difference between the shaft 43 of the decelerator 40, the bearing 50, and the second link 12, and maintains concentricity between the shaft 43 of the decelerator 40, the bearing 50, and the second link 12. The inner flange 61 of the adapter 60 comprises the mating part 72 that mates with the shaft 43 of the decelerator 40, the outer peripheral surface of the cylindrical part 62 of the adapter 60 is inscribed in (is in contact with the inner peripheral surface of) the inner race 51 of the bearing 50, and the second link 12 comprises the mating part 73 that mates with the cylindrical part 62 of the adapter 60, whereby concentricity between the shaft 43 of the decelerator 40, the bearing 50, and the second link 12 can be achieved. The shaft 43 of the decelerator 40, the bearing 50, and the second link 12 are aligned with the first axis line J1 by the adapter 60, which maintains concentricity between the shaft 43 of the decelerator 40, the bearing 50, and the second link 12.

The shaft 43 and case 44 of the decelerator 40 may be assembled with their respective axis centers shifted due to the gap between the shaft 43 and case 44 (for example, the gap between gears), but since the adapter 60 maintains concentricity between the shaft 43 of the decelerator 40 and the bearing 50, and the first link 11 maintains concentricity between the case 44 of the decelerator 40 and the bearing 50, the respective axis centers of shaft 43 and case 44 of the decelerator 40 are also aligned with the first axis line J1.

According to the centering structure of the third embodiment described above, the axes of the decelerator 40 and the bearing 50 are aligned by the adapter 60, which maintains concentricity between the decelerator 40 and the bearing 50, whereby vibration of the decelerator 40 is reduced and damage to the decelerator 40 can be suppressed. In particular, the axis centers of the shaft 43 and case 44 of the decelerator 40 are aligned by the adapter 60, which maintains concentricity between the shaft 43 of the decelerator 40 and the bearing 50, and the first link 11, which maintains concentricity between the case 44 of the decelerator 40 and the bearing 50, whereby vibration is reduced when the shaft 43 and case 44 of the decelerator 40 are assembled with their axes misaligned, and damage to the decelerator 40 can be suppressed. Furthermore, since the machine 1 is provided with such a centering structure, vibration of the machine 1 is reduced, whereby damage to the machine 1 can be suppressed and the positioning accuracy of the machine 1 can be improved. Furthermore, since the adapter 60 has a simple shape, the centering accuracy of the adapter 60 can be improved.

Figure 5:
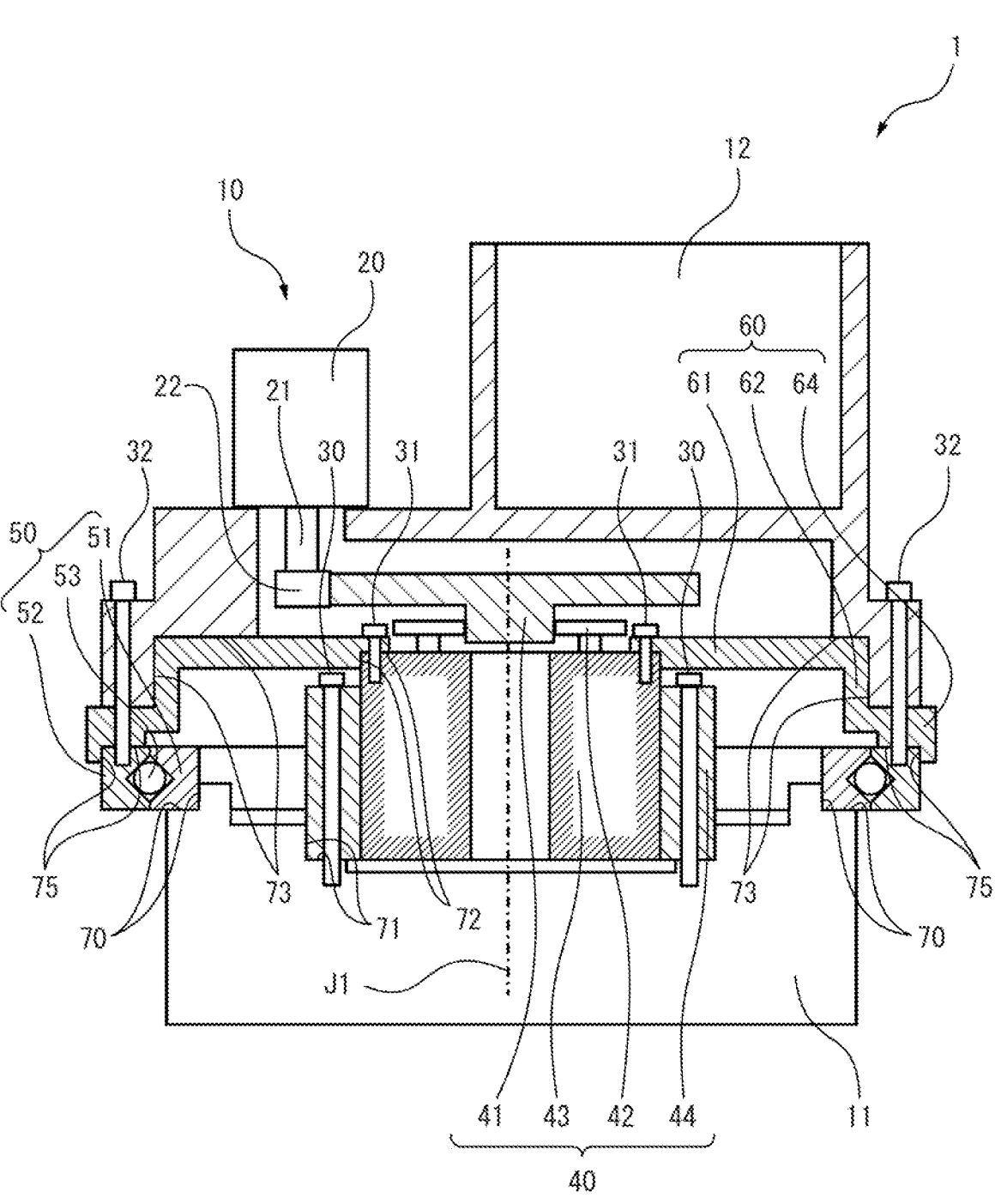
FIG. 5 is a cross-sectional view of the centering structure of a fourth embodiment taken along line II-II.

The centering structure of a fourth embodiment will be described below. FIG. 5 is a cross-sectional view of the centering structure of the fourth embodiment taken along line II-II. The centering structure of the fourth embodiment differs from the centering structure of the first embodiment in that the inner race 51 of the bearing 50 is affixed to the first link 11 with screws (not illustrated), and the outer race 52 of the bearing 50 is affixed to the second link 12 with the screws 32 via the adapter 60. Furthermore, this centering structure differs from the centering structure of the first embodiment in that the adapter 60 does not comprise the first outer flange 63, and the mating part 75 of the second outer flange 64 of the adapter 60 is circumscribed on (in contact with the outer circumferential surface of) the outer race 52 of the bearing 50.

The electric motor 20 rotates the rotating shaft 21 and the motor side gear 22, and transmits torque from the motor side gear 22 to the central gear 41 of the decelerator 40. The decelerator 40 decelerates and rotates the central gear 41, the orbiting gears 42, and the shaft 43 in this order, and transmits a larger torque from the shaft 43 to the adapter 60. The adapter 60 rotates to transmit torque to the second link 12, and the bearing 50 rotatably supports the second link 12. The bearing 50 supports the links 12 to 17 of the machine 1 and the load exerted on the tip of the machine 1.

Since the outer diameter of the case 44 of the decelerator 40 is smaller than the inner diameter of the bearing 50, it is necessary to establish concentricity between the case 44 of the decelerator 40 and the bearing 50. The first link 11 comprises the mating part 70 that mates with the inner race 51 of the bearing 50 and the mating part 71 that mates with the case 44 of the decelerator 40, whereby concentricity can be established between the case 44 of the decelerator 40 and the bearing 50. The mating part 70 is, for example, a stepped flange, and the mating part 71 is, for example, a stepped hole. Due to the first link 11, which maintains concentricity between the case 44 of the decelerator 40 and the bearing 50, the respective axis centers of the case 44 of the decelerator 40 and the bearing 50 are aligned with the first axis line J1.

Since the outer diameter of the shaft 43 of the decelerator 40 is smaller than the inner diameter of the bearing 50 and the inner diameter of the second link 12, the adapter 60 compensates for the size difference between the shaft 43 of the decelerator 40, the bearing 50, and the second link 12, and maintains concentricity between the shaft 43 of the decelerator 40, the bearing 50, and the second link 12. The inner flange 61 of the adapter 60 comprises the mating part 72 that mates with the shaft 43 of the decelerator 40, the second outer flange 64 of the adapter 60 comprises the mating part 75, which is circumscribed on the outer race 52 of the bearing 50, and the second link 12 comprises the mating part 73 that mates with the cylindrical part 62 of the adapter 60, whereby concentricity between the shaft 43 of the decelerator 40, the bearing 50, and the second link 12 can be achieved. The mating parts 72, 75, 73 are, for example, stepped holes. The shaft 43 of the decelerator 40, the bearing 50, and the second link 12 are aligned with the first axis line J1 by the adapter 60, which maintains concentricity between the shaft 43 of the decelerator 40, the bearing 50, and the second link 12.

The shaft 43 and case 44 of the decelerator 40 may be assembled with their respective axis centers shifted due to the gap between the shaft 43 and case 44 (for example, the gap between gears), but since the adapter 60 maintains concentricity between the shaft 43 of the decelerator 40 and the bearing 50, and the first link 11 maintains concentricity between the case 44 of the decelerator 40 and the bearing 50, the respective axis centers of shaft 43 and case 44 of the decelerator 40 are also aligned with the first axis line J1.

According to the centering structure of the fourth embodiment described above, the axes of the decelerator 40 and the bearing 50 are aligned by the adapter 60, which maintains concentricity between the decelerator 40 and the bearing 50, whereby vibration of the decelerator 40 is reduced and damage to the decelerator 40 can be suppressed. In particular, the axes of the shaft 43 and case 44 of the decelerator 40 are aligned by the adapter 60, which maintains concentricity between the shaft 43 of the decelerator 40 and the bearing 50, and the first link 11, which maintains concentricity between the case 44 of the decelerator 40 and the bearing 50, whereby vibration is reduced when the shaft 43 and case 44 of the decelerator 40 are assembled with their axes misaligned, and damage to the decelerator 40 can be suppressed. Furthermore, since the machine 1 is provided with such a centering structure, vibration of the machine 1 is reduced, whereby damage to the machine 1 can be suppressed and the positioning accuracy of the machine 1 can be improved.

Figure 6:
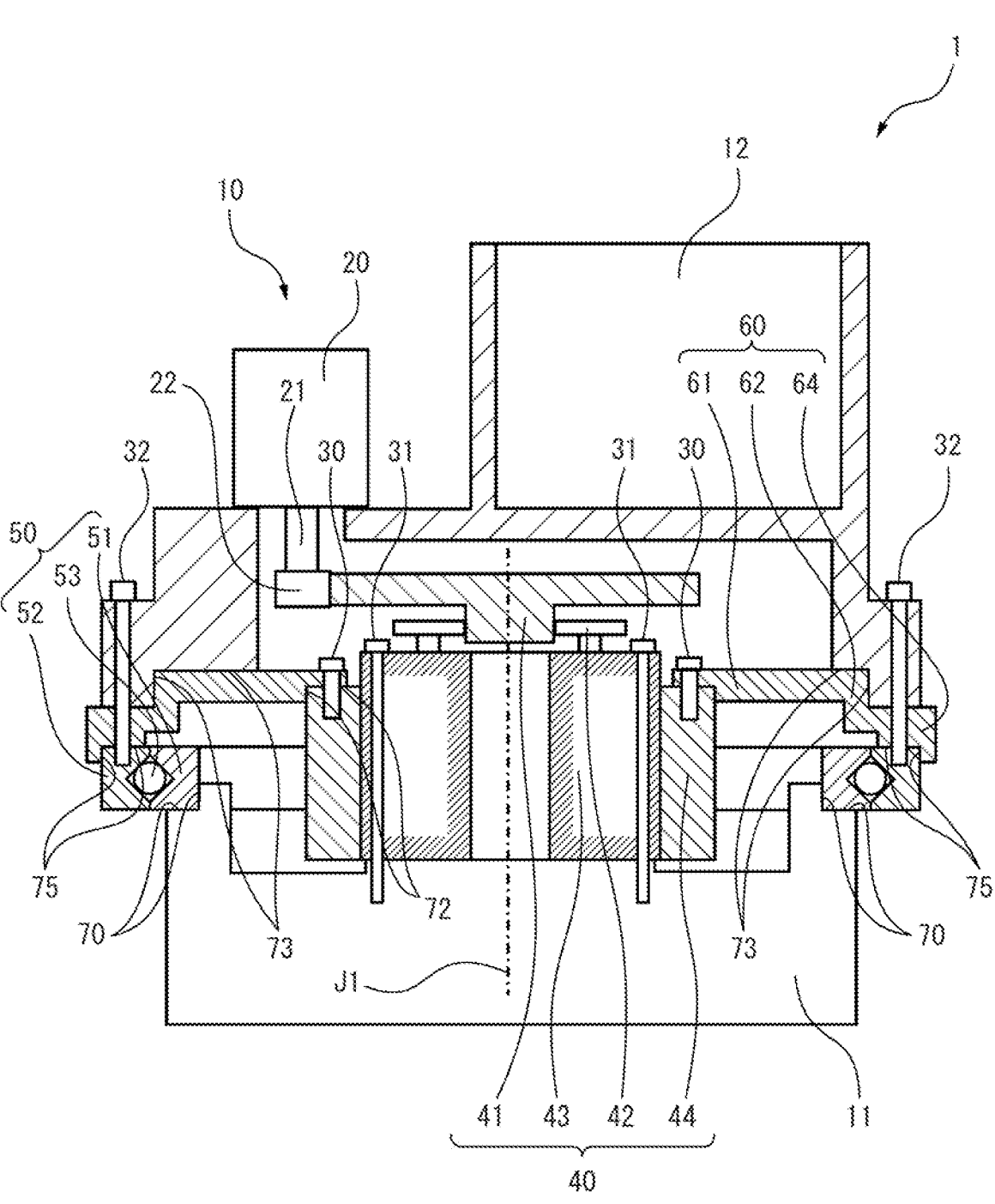
FIG. 6 is a cross-sectional view of the centering structure of a fifth embodiment taken along line II-II.

The centering structure of a fifth embodiment will be described below. FIG. 6 is a cross-sectional view of the centering structure of the fifth embodiment taken along line II-II. The centering structure of the fifth embodiment differs from the centering structure of the first embodiment in that the inner race 51 of the bearing 50 is affixed to the first link 11 with screws (not illustrated), and the outer race 52 of the bearing 50 is affixed to the second link 12 with the screws 32 via the adapter 60. Furthermore, this centering structure differs from the centering structure of the first embodiment in that the shaft 43 of the decelerator 40 is affixed to the first link 11 with the screws 31, and the case 44 of the decelerator 40 is affixed to the inner flange 61 of the adapter 60 with the screws 30.

The electric motor 20 rotates the rotating shaft 21 and the motor side gear 22, and transmits torque from the motor side gear 22 to the central gear 41 of the decelerator 40. The decelerator 40 decelerates and rotates the central gear 41, the orbiting gears 42, and the case 44 in this order, and transmits a larger torque to the adapter 60 via the case 44. The adapter 60 rotates to transmit torque to the second link 12, and the bearing 50 rotatably supports the second link 12. The bearing 50 supports the links 12 to 17 of the machine 1 and the load exerted on the tip of the machine 1.

In the fifth embodiment, since the case 44 of the decelerator 40 rotates, the first link 11 does not comprise the mating part 71 that mates with the case 44 of the decelerator 40 in the manner of the first embodiment. The first link 11 comprises the mating part 70 that mates with the inner race 51 of the bearing 50, and screw holes for fastening the shaft 43 of the decelerator 40 with the screws 31, whereby concentricity between shaft 43 of the decelerator 40 and the bearing 50 can be achieved. Specifically, the screw holes of the first link 11 for connecting the shaft 43 of the decelerator 40 are precisely machined for positioning the shaft 43 of the decelerator 40. Due to the first link 11, which maintains concentricity between the shaft 43 of the decelerator 40 and the bearing 50, the respective axis centers of the shaft 43 of the decelerator 40 and the bearing 50 are aligned with the first axis line J1.

Since the outer diameter of the case 44 of the decelerator 40 is smaller than the inner diameter of the bearing 50 and the inner diameter of the second link 12, the adapter 60 compensates for the size difference between the case 44 of the decelerator 40, the bearing 50, and the second link 12, and also maintains concentricity between the case 44 of the decelerator 40, the bearing 50, and the second link 12. The inner flange 61 of the adapter 60 comprises the mating part 72 that mates with the case 44 of the decelerator 40, the second outer flange 64 of the adapter 60 comprises the mating part 75, which is circumscribed on the outer race 52 of the bearing 50, and the second link 12 comprises the mating part 73 that mates with the cylindrical part 62 of the adapter 60, whereby concentricity between the case 44 of the decelerator 40, the bearing 50, and the second link 12 can be achieved. The mating parts 72, 75, 73 are, for example, stepped holes. The adapter 60 maintains concentricity between the case 44 of the decelerator 40, the bearing 50, and the second link 12, whereby the respective axis centers of the case 44 of the decelerator 40, the bearing 50, and the second link 12 are aligned with the first axis line J1.

The shaft 43 and case 44 of the decelerator 40 may be assembled with their respective axis centers shifted due to the gap between the shaft 43 and case 44 (for example, the gap between gears), but since the adapter 60 maintains concentricity between the case 44 of the decelerator 40 and the bearing 50, and the first link 11 maintains concentricity between the shaft 43 of the decelerator 40 and the bearing 50, the respective axis centers of the shaft 43 and case 44 of the decelerator 40 are also aligned with the first axis line J1.

According to the centering structure of the fifth embodiment described above, the axes of the decelerator 40 and the bearing 50 are aligned by the adapter 60, which maintains concentricity between the decelerator 40 and the bearing 50, whereby vibration of the decelerator 40 is reduced and damage to the decelerator 40 can be suppressed. In particular, the axis centers of the shaft 43 and case 44 of the decelerator 40 are aligned by the adapter 60, which maintains concentricity between the case 44 of the decelerator 40 and the bearing 50, and the first link 11 that maintains concentricity of the shaft 43 of the decelerator 40 and the bearing 50, whereby vibration is reduced when the shaft 43 and case 44 of the decelerator 40 are assembled with their axes misaligned, and damage to the decelerator 40 can be suppressed. Furthermore, since the machine 1 is provided with such a centering structure, vibration of the machine 1 is reduced, whereby damage to the machine 1 can be suppressed and the positioning accuracy of the machine 1 can be improved.

Figure 7:
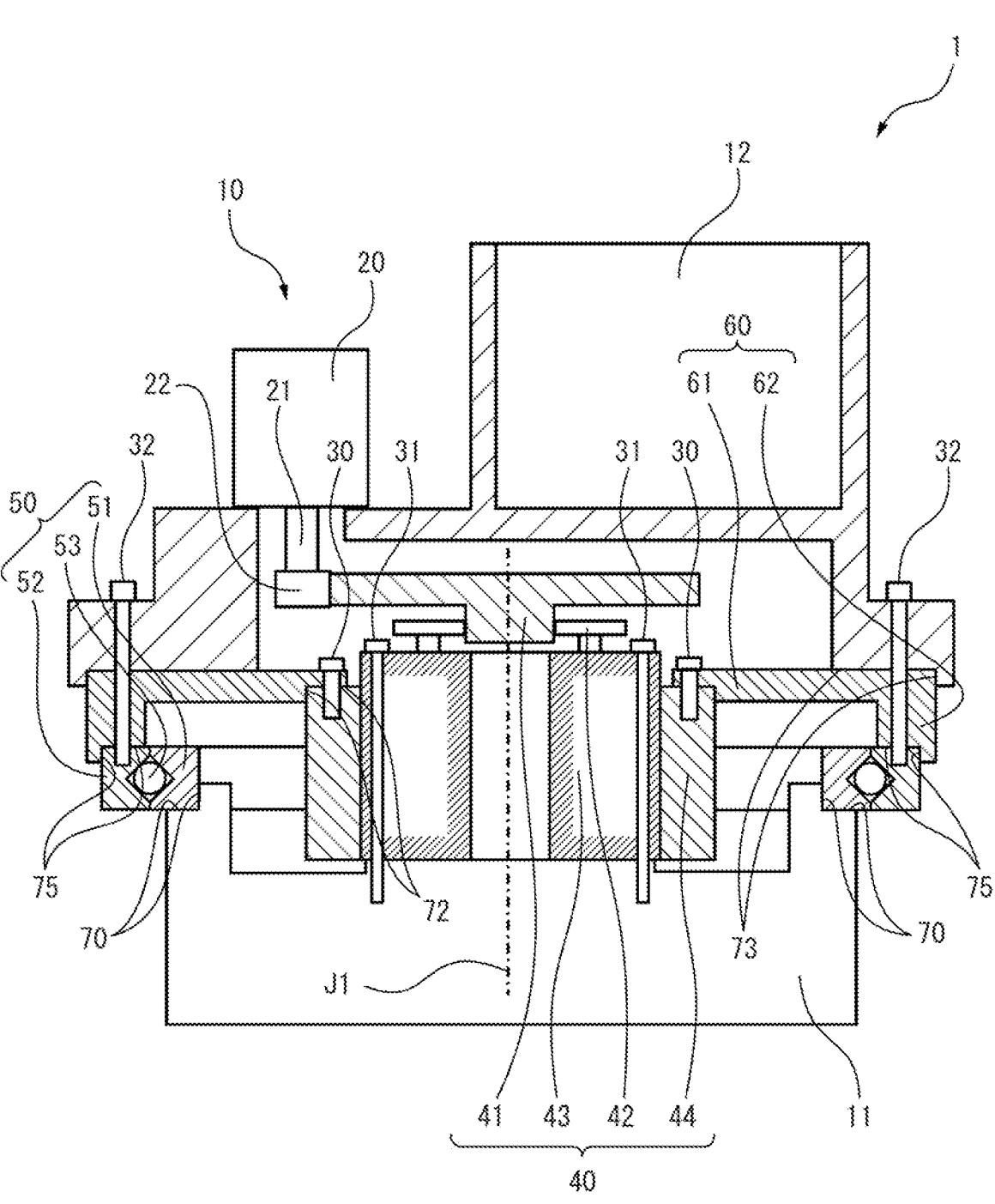
FIG. 7 is a cross-sectional view of the centering structure of a sixth embodiment taken along line II-II.

The centering structure of a sixth embodiment will be described below. FIG. 7 is a cross-sectional view of the centering structure of the sixth embodiment taken along line II-II. The centering structure of the sixth embodiment differs from the centering structure of the first embodiment in that the inner race 51 of the bearing 50 is affixed to the first link 11 with screws (not illustrated), and the outer race 52 of the bearing 50 is affixed to the second link 12 with the screws 32 via the adapter 60. Furthermore, this centering structure differs from the centering structure of the first embodiment in that the adapter 60 does not comprise the first outer flange 63 and the second outer flange 64, but comprises only the inner flange 61 and the cylindrical part 62. Specifically, the adapter 60 has a simpler shape.

The electric motor 20 rotates the rotating shaft 21 and the motor side gear 22, and transmits torque from the motor side gear 22 to the central gear 41 of the decelerator 40. The decelerator 40 decelerates and rotates the central gear 41, the orbiting gears 42, and the case 44 in this order, and transmits a larger torque from the case 44 to the adapter 60. The adapter 60 rotates and transmits torque to the second link 12. The bearing 50 supports the links 12 to 17 of the machine 1 and the load exerted on the tip of the machine 1.

In the sixth embodiment, since the case 44 of the decelerator 40 rotates, the first link 11 does not comprise the mating part 71 that mates with the case 44 of the decelerator 40 in the manner of the fourth embodiment. The first link 11 comprises the mating part 70 that mates with the inner race 51 of the bearing 50, and screw holes for fastening the shaft 43 of the decelerator 40 with the screws 31, whereby concentricity between shaft 43 of the decelerator 40 and the bearing 50 can be achieved. Specifically, the screw holes of the first link 11 for connecting the shaft 43 of the decelerator 40 are precisely machined for positioning the shaft 43 of the decelerator 40. Due to the first link 11, which maintains concentricity between the shaft 43 of the decelerator 40 and the bearing 50, the respective axis centers of the shaft 43 of the decelerator 40 and the bearing 50 are aligned with the first axis line J1.

Since the outer diameter of the case 44 of the decelerator 40 is smaller than the inner diameter of the bearing 50 and the inner diameter of the second link 12, the adapter 60 compensates for the size difference between the case 44 of the decelerator 40, the bearing 50, and the second link 12, and also maintains concentricity between the case 44 of the decelerator 40, the bearing 50, and the second link 12. The inner flange 61 of the adapter 60 comprises mating part 72 that mates with the case 44 of the decelerator 40, the cylindrical part 62 of the adapter 60 comprises the mating part 75, which is circumscribed on the outer race 52 of the bearing 50, and the second link 12 comprises the mating part 73 that mates with the cylindrical part 62 of the adapter 60, whereby concentricity between the case 44 of the decelerator 40, the bearing 50, and the second link 12 can be achieved. The adapter 60 maintains concentricity between the case 44 of the decelerator 40, the bearing 50, and the second link 12, whereby the respective axis centers of the case 44 of the decelerator 40, the bearing 50, and the second link 12 are aligned with the first axis line J1.

The shaft 43 and case 44 of the decelerator 40 may be assembled with their respective axis centers shifted due to the gap between the shaft 43 and case 44 (for example, the gap between gears), but since the adapter 60 maintains concentricity between the case 44 of the decelerator 40 and the bearing 50, and the first link 11 maintains concentricity between the shaft 43 of the decelerator 40 and the bearing 50, the respective axis centers of the shaft 43 and case 44 of the decelerator 40 are also aligned with the first axis line J1.

According to the centering structure of the sixth embodiment described above, the axes of the decelerator 40 and the bearing 50 are aligned by the adapter 60, which maintains concentricity between the decelerator 40 and the bearing 50, whereby vibration of the decelerator 40 is reduced and damage to the decelerator 40 can be suppressed. In particular, the axes of the shaft 43 and case 44 of the decelerator 40 are aligned by adapter 60, which maintains concentricity between the case 44 of the decelerator 40 and the bearing 50, and first link 11, which maintains concentricity between shaft 43 of the decelerator 40 and the bearing 50, whereby vibration is reduced when the shaft 43 and case 44 of the decelerator 40 are assembled with their axes misaligned, and damage to the decelerator 40 can be suppressed. Furthermore, since the machine 1 is provided with such a centering structure, vibration of the machine 1 is reduced, whereby damage to the machine 1 can be suppressed and the positioning accuracy of the machine 1 can be improved. Furthermore, since the adapter 60 has a simple shape, the centering accuracy of the adapter 60 can be improved.

Figure 8:
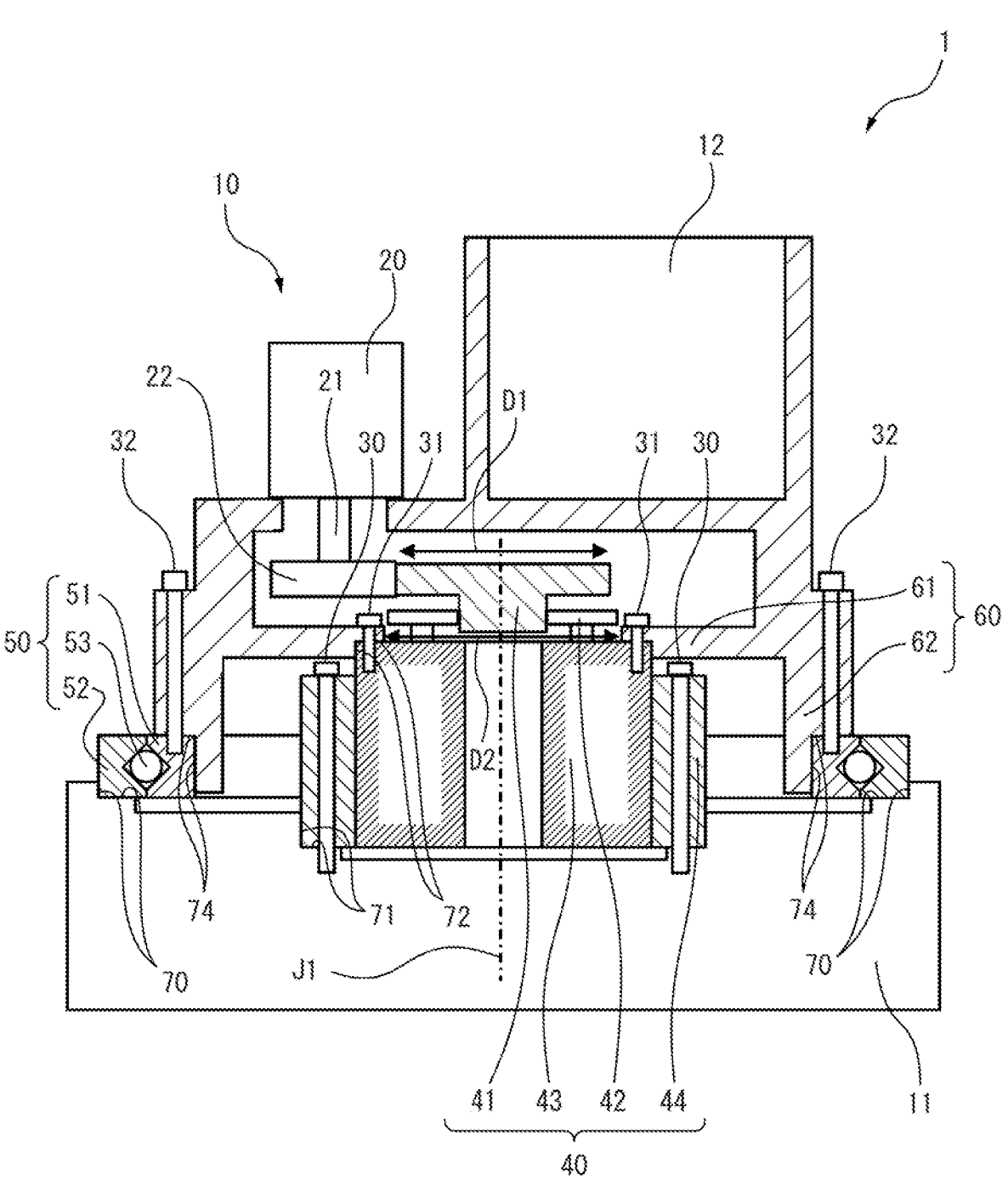
FIG. 8 is a cross-sectional view of the centering structure of a seventh embodiment taken along line II-II.

The centering structure of a seventh embodiment will be described below. FIG. 8 is a cross-sectional view of the centering structure of the seventh embodiment taken along line II-II. The centering structure of the seventh embodiment differs from the centering structure of the first embodiment in that it comprises a second link 12 in which the adapter 60 is integrated. Specifically, the second link 12 comprises the inner flange 61 and the cylindrical part 62, the inner flange 61 of the second link 12 is affixed to the shaft 43 of the decelerator 40 with the screws 31, and the cylindrical part 62 of the second link 12 is affixed to the inner race 51 of the bearing 50 with the screws 32. Since the adapter 60 is integrated in the second link 12, the inner diameter D2 of the inner flange 61 of the second link 12 or the inner diameter D2 of a part of the inner flange 61 is larger than the outer diameter D1 of the central gear 41 of the decelerator 40 so that the central gear 41 of the decelerator 40 can be arranged inside the second link 12 rather than the inner flange 61 of the second link 12.

The electric motor 20 rotates the rotating shaft 21 and the motor side gear 22, and transmits torque from the motor side gear 22 to the central gear 41 of the decelerator 40. The decelerator 40 decelerates and rotates the central gear 41, the orbiting gears 42, and the shaft 43 in this order, and directly transmits a larger torque from the shaft 43 to the second link 12. The bearing 50 rotatably supports the second link 12. The bearing 50 supports the links 12 to 17 of the machine 1 and the load exerted on the tip of the machine 1.

Since the outer diameter of the case 44 of the decelerator 40 is smaller than the inner diameter of the bearing 50, it is necessary to establish concentricity between the case 44 of the decelerator 40 and the bearing 50. The first link 11 comprises the mating part 70 that mates with the outer race 52 of the bearing 50, and the mating part 71 that mates with the case 44 of the decelerator 40, whereby concentricity between the case 44 of the decelerator 40 and the bearing 50 can be achieved. The mating parts 70, 71 are, for example, stepped holes. Due to the first link 11, which maintains concentricity between the case 44 of the decelerator 40 and the bearing 50, the respective axis centers of the case 44 of the decelerator 40 and the bearing 50 are aligned with the first axis line J1.

Since the outer diameter of the shaft 43 of the decelerator 40 is smaller than the inner diameter of the bearing 50, the second link 12 compensates for the size difference between the shaft 43 of the decelerator 40 and the bearing 50, and also maintains concentricity between the shaft 43 of the decelerator 40 and the bearing 50. The inner flange 61 of the second link 12 comprises the mating part 72 that mates with the shaft 43 of the decelerator 40, and the cylindrical part 62 of the second link 12 comprises a mating part 74, which is inscribed in (is in contact with the inner peripheral surface of) the inner race 51 of the bearing 50, whereby concentricity between the shaft 43 of the decelerator 40 and the bearing 50 can be achieved. The mating part 72 is, for example, a stepped hole, and the mating part 74 is, for example, a stepped flange. Due to the second link 12, which maintains concentricity between the shaft 43 of the decelerator 40 and the bearing 50, the respective axis centers of the shaft 43 of the decelerator 40 and the bearing 50 are aligned with the first axis line J1.

The shaft 43 and case 44 of the decelerator 40 may be assembled with their respective axis centers shifted due to the gap between the shaft 43 and case 44 (for example, the gap between gears), but since the second link 12 maintains concentricity between the shaft 43 of the decelerator 40 and the bearing 50, and the first link 11 maintains concentricity between the case 44 of the decelerator 40 and the bearing 50, the respective axis centers of the shaft 43 and case 44 of the decelerator 40 are also aligned with first axis line J1.

According to the centering structure of the seventh embodiment described above, the axes of the decelerator 40 and the bearing 50 are aligned by the second link 12, which maintains concentricity between the decelerator 40 and the bearing 50, whereby vibration of the decelerator 40 is reduced and damage to the decelerator 40 can be suppressed. In particular, the axis centers of the shaft 43 and case 44 of the decelerator 40 are aligned by the second link 12, which maintains concentricity between the shaft 43 of the decelerator 40 and the bearing 50, and the first link 11, which maintains concentricity between the case 44 of the decelerator 40 and the bearing 50, whereby vibration is reduced when the shaft 43 and case 44 of the decelerator 40 are assembled with their axes misaligned, and damage to the decelerator 40 can be suppressed. Furthermore, since the machine 1 is provided with such a centering structure, vibration of the machine 1 is reduced, whereby damage to the machine 1 can be suppressed and the positioning accuracy of the machine 1 can be improved.

Figure 9:
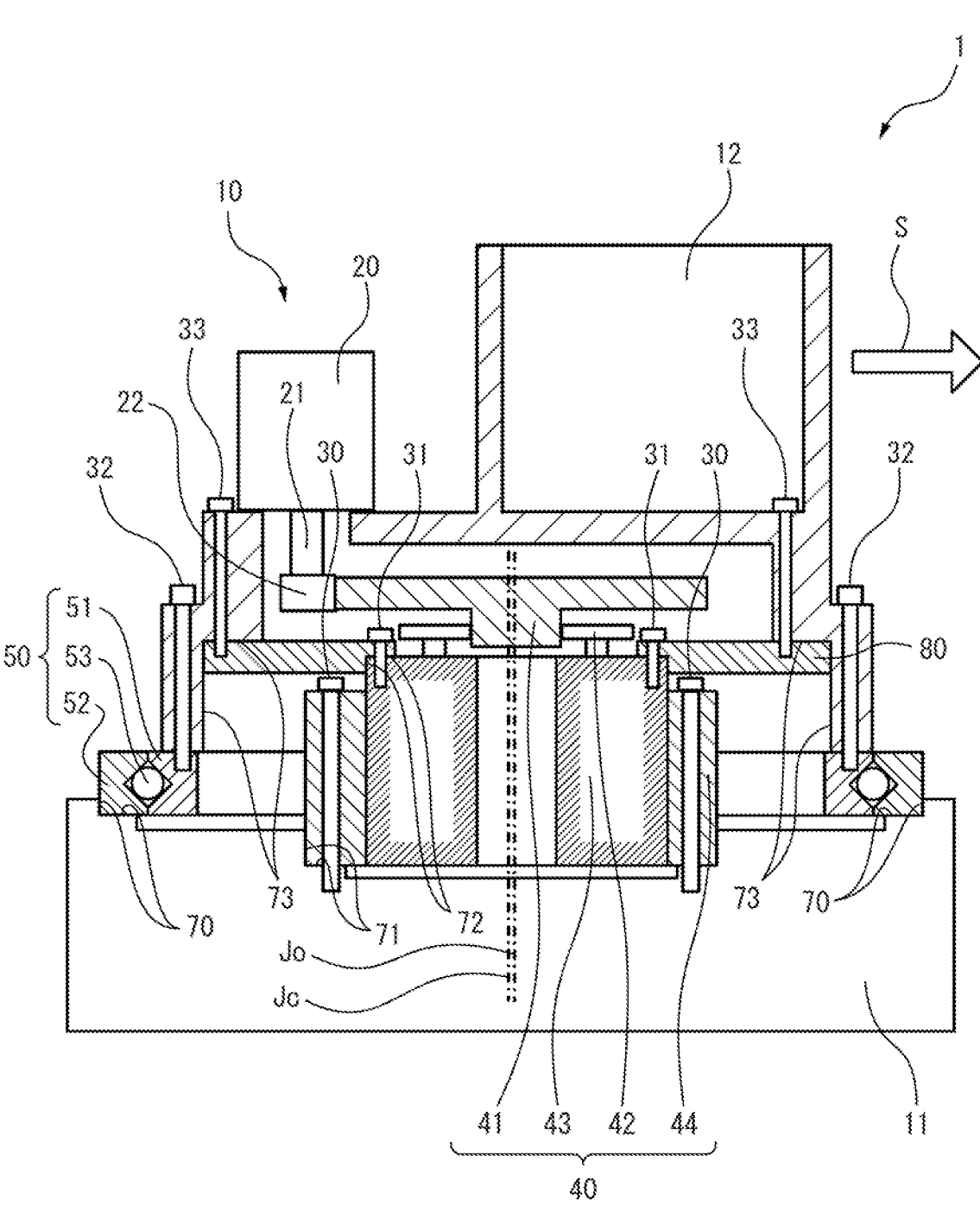
FIG. 9 is a cross-sectional view of the structure of a comparative example taken along II-II.

The centering structure of a comparative example will be described below. FIG. 9 is a cross-sectional view of the centering structure of the comparative example taken along line II-II. The centering structure of the comparative example differs from the centering structure of the first embodiment in that the adapter 80 is a ring-shaped plate and comprises only an inner peripheral part and an outer peripheral part. The inner circumference of the adapter 80 comprises the mating part 72 that mates with the shaft 43 of the decelerator 40, and the second link 12 comprises the mating part 73 that mates with the outer circumference of the adapter 80, whereby concentricity between the shaft 43 of the decelerator 40 and the second link 12 can be achieved. The mating parts 72 and 73 are, for example, stepped holes.

However, since the adapter 80 cannot achieve concentricity between shaft 43 of the decelerator 40 and the bearing 50, if the size of the screw holes used for affixation of the second link 12 to the inner race 51 of the bearing 50 with the screws 32 is larger than the screws 32, the second link 12 may be assembled shifted relative to the bearing 50 in the direction of the arrow S. Since the adapter 80, which mates to the mating part 73 of the second link 12, is also shifted in the direction of the arrow S when the second link 12 is shifted in the direction of the arrow S and is affixed, due to the gap between the shaft 43 and the case 44 of the decelerator 40 (for example, the gap between gears), the axis line Jo of the shaft 43 and the axis line Jc of the case 44 of the decelerator 40 are misaligned when assembled. If the shaft 43 and case 44 of the decelerator 40 are assembled with their respective axial centers shifted, vibration may occur in the decelerator 40 and the decelerator 40 may be damaged. Furthermore, vibration occurs in machine 1, leading to early damage to the machine 1 and deterioration in the positioning accuracy of the machine 1.

However, according to the centering structure of the various embodiments described above, the axes of the decelerator 40 and the bearing 50 can be aligned by the adapter 60, which maintains concentricity between the decelerator 40 and the bearing 50. As a result, vibration of the decelerator 40 is reduced, and damage to the decelerator 40 can be suppressed. Furthermore, since the machine 1 is provided with such a centering structure, vibration of the machine 1 is reduced, whereby damage to the machine 1 can be suppressed and the positioning accuracy of the machine 1 can be improved.

Though various embodiments have been described in the present specification, the present invention is not limited to the embodiments described above, and it should be appreciated that various modifications may be made within the scope of the following claims.

REFERENCE SIGNS LIST 1 machine
10 actuator
11 to 17 link
18 wrist unit
20 electric motor
21 rotating shaft
22 motor side gear
30 to 34 screw
40 decelerator
41 central gear
42 orbiting gear
43 shaft
44 case
50 bearing
51 inner race
52 outer race
53 rolling body
60 adapter
61 inner flange
62 cylindrical part
63 first outer flange
64 second outer flange
70 to 75 mating part
J1 to J6 axis line
D1 outer diameter of central gear
D2 inner diameter of inner flange
The invention claimed is:

1. A centering structure, comprising:
a decelerator,
a bearing which is arranged radially outward from a center line of the decelerator,
an adapter which is affixed to the decelerator to maintain concentricity between the decelerator and the bearing;
a first link, which secures the decelerator and the bearing; and
a second link, which mates with the adapter,
wherein the adapter includes a cylindrical part, an inner flange extending inward from the cylindrical part, a first outer flange extending outward from the cylindrical part, and a second outer flange extending outward from the cylindrical part,
wherein the inner flange is fixed to the decelerator, wherein the first outer flange is fixed to the second link, and wherein the second outer flange is in contact with the bearing.

2. The centering structure according to claim 1, wherein the adapter is inscribed in an inner race of the bearing or circumscribed in an outer race of the bearing.

3. The centering structure according to claim 1, wherein the adapter is affixed to a shaft or a case of the decelerator.

4. The centering structure according to claim 1, wherein the adapter mates with the decelerator.

5. The centering structure according to claim 1, wherein the first link maintains concentricity between the decelerator and the bearing.

6. The centering structure according to claim 1, wherein the bearing is arranged between a top surface and a bottom surface of the decelerator.

\* \* \* \* \*